(12) United States Patent
Umesaka

(10) Patent No.: US 9,777,648 B2
(45) Date of Patent: Oct. 3, 2017

(54) ELECTRONIC CONTROLLER

(71) Applicant: DENSO CORPORATION, Kariya, Aichi-pref. (JP)

(72) Inventor: Takeo Umesaka, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/956,442

(22) Filed: Dec. 2, 2015

(65) Prior Publication Data

US 2016/0186674 A1    Jun. 30, 2016

(30) Foreign Application Priority Data

Dec. 25, 2014  (JP) .................................. 2014-263123

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *F02D 29/02* | (2006.01) |
| *B60L 11/18* | (2006.01) |

(52) U.S. Cl.
CPC .............. *F02D 29/02* (2013.01); *B60L 11/18* (2013.01)

(58) Field of Classification Search
CPC ....... B60L 11/18; B60W 20/00; B60W 10/08; B60W 10/06; Y02T 10/6286; B60K 6/445

USPC ........................................................... 701/22
See application file for complete search history.

(56) References Cited

U.S. PATENT DOCUMENTS

| 2010/0023207 A1 | 1/2010 | Maeda et al. |
| 2013/0297137 A1 | 11/2013 | Fushiki et al. |

FOREIGN PATENT DOCUMENTS

| JP | H10-160492 A | 6/1998 |
| JP | 2009-035016 A | 2/2009 |
| JP | 2014-218115 A | 11/2014 |

*Primary Examiner* — Maceeh Anwari
(74) *Attorney, Agent, or Firm* — Posz Law Group, PLC

(57) ABSTRACT

An electronic controller controls a drive of a vehicle that uses an internal combustion engine and an electric motor as a driving source. The electronic controller includes a travelling distance calculation portion, a diagnosis portion, and a control portion. The travelling distance calculation portion calculates a travelling distance where the vehicle can travel by using the electric motor as the driving source, based on a power surplus quantity of a battery that supplies electric power to the electric motor. The diagnosis portion diagnoses a diagnosis object included in the internal combustion engine. The control portion controls the internal combustion engine. When a condition that the travelling distance is shorter than or equal to a threshold distance that is predetermined is satisfied, the control portion forcibly drives the diagnosis object and controls the diagnosis portion to execute a malfunction diagnosis of the diagnosis object.

13 Claims, 4 Drawing Sheets

ELECTRONIC CONTROLLER

CROSS REFERENCE TO RELATED APPLICATION

This application is based on Japanese Patent Application No. 2014-263123 filed on Dec. 25, 2014, the disclosure of which is incorporated herein by reference.

TECHNICAL FIELD

The present disclosure relates to an electronic controller which controls a hybrid vehicle.

BACKGROUND

JP 2008-254507 A (US 2010/0023207 A1) discloses a malfunction diagnosis that is a detection of a malfunction generated in a vehicle.

SUMMARY

Recently, in a hybrid vehicle (HV) including an internal combustion engine and an electric motor, a travelling distance in an EV travelling mode in which the hybrid vehicle travels only by using the electric motor becomes longer and longer, according to an improvement of a storage capacity of a battery or a reduction of a power consumption in electronic devices.

Thus, it is possible that the internal combustion engine is not driven in a travelling of a relatively short distance. The travelling generally occurs when the hybrid vehicle travels in a town or a city or an area of the town or an area of the city. In this case, a frequency of the malfunction diagnosis of the internal combustion engine is decreased. Further, the malfunction diagnosis is executed only at a timing that the travelling using the electric motor is switched to the travelling using the internal combustion engine. In other words, since the malfunction diagnosis of the internal combustion engine is executed in the travelling of the hybrid vehicle, it is possible that a drivability is deteriorated.

It is an object of the present disclosure to provide an electronic controller which can improve an executing timing of a malfunction diagnosis of an internal combustion engine.

According to an aspect of the present disclosure, an electronic controller controls a drive of a vehicle that uses an internal combustion engine and an electric motor as a driving source. The electronic controller includes a travelling distance calculation portion, a diagnosis portion, and a control portion. The travelling distance calculation portion calculates a travelling distance where the vehicle can travel by using the electric motor as the driving source, based on a power surplus quantity of a battery that supplies electric power to the electric motor. The diagnosis portion diagnoses a diagnosis object included in the internal combustion engine. The control portion controls the internal combustion engine. When a condition that the travelling distance is shorter than or equal to a threshold distance that is predetermined is satisfied, the control portion forcibly drives the diagnosis object and controls the diagnosis portion to execute a malfunction diagnosis of the diagnosis object.

When it is assumed that the driving source of the hybrid vehicle is changed from the electric motor to the internal combustion engine in a travelling of the hybrid vehicle, the diagnosis object included in the internal combustion engine can be diagnosed before the hybrid vehicle starts to be driven by the internal combustion engine. Thus, when a malfunction affecting the travelling where the internal combustion engine is used is generated, it can be avoided that a drivability is deteriorated due to a timing that the internal combustion engine is switched to be used as the driving source in the travelling. Conventionally, when the internal combustion engine starts to be used in a case where the internal combustion engine is not used for a long time period, the malfunction diagnosis is executed and it is possible that a malfunction of the internal combustion engine is detected. According to the present disclosure, since the malfunction diagnosis is forcibly executed before the internal combustion engine is used, the malfunction of the internal combustion engine can be detected, and the hybrid vehicle can travel to a vehicle dealer in the EV travelling mode.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
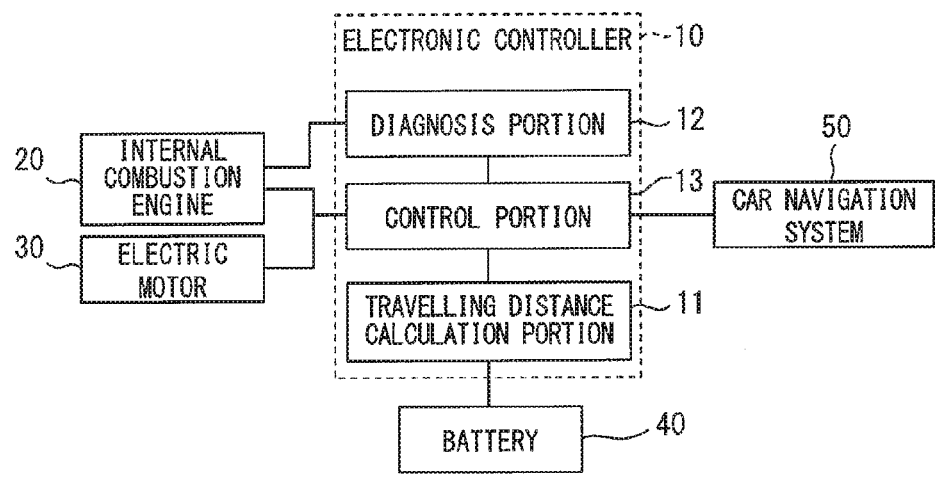
FIG. 1 is a block diagram showing an outline of an electronic controller and peripheral devices of the electronic controller, according to an embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, referring to drawings, an embodiment of the present disclosure will be described. In addition, the substantially same parts and components are indicated with the same reference numeral in following embodiments.

Embodiment

Referring to FIG. 1, a configuration of an electronic controller 10 according to an embodiment of the present disclosure will be described.

The electronic controller 10 is a device controlling a drive of a hybrid vehicle (HV) that uses an internal combustion engine 20 and an electric motor 30 as a driving source.

As shown in FIG. 1, the electronic controller 10 includes a travelling distance calculation portion 11; a diagnosis portion 12, and a control portion 13. The electronic controller 10 is connected with the internal combustion engine 20 and the electric motor 30, and can communicate with the internal combustion engine 20 and the electric motor 30. The electronic controller 10 controls the internal combustion engine 20 and the electric motor 30 to control the hybrid vehicle to travel.

The travelling distance calculation portion 11 is connected with a battery 40 that supplies electric power to the control portion 13 and the electric motor 30. The travelling distance calculation portion 11 calculates a travelling distance D where the hybrid vehicle can travel by using the electric motor 30 as the driving source, based on a power surplus quantity of the battery 40. The power surplus quantity of the battery 40 is a quantity of a surplus power in the battery 40. Then, the travelling distance calculation portion 11 outputs the travelling distance D to the control portion 13.

The diagnosis portion 12 executes a malfunction diagnosis of a device that is a diagnosis object, based on an instruction of the control portion 13. According to the present embodiment, the diagnosis portion 12 is at least connected with the internal combustion engine 20. Specifically, the diagnosis portion 12 is connected with an actuator and a sensor which are diagnosis objects and are components constituting the internal combustion engine 20. The diagnosis portion 12 executes the malfunction diagnosis of the actuator and the malfunction diagnosis of the sensor according to diagnosis procedures which are predetermined, respectively.

The control portion 13 is connected with the internal combustion engine 20 and the electric motor 30, and can communicate with the internal combustion engine 20 and the electric motor 30. The control portion 13 controls an actuator provided in the internal combustion engine 20 or the electric motor 30 so as to control the hybrid vehicle to travel. The control portion 13 is further connected with the travelling distance calculation portion 11, the diagnosis portion 12, and a car navigation system 50, and can communicate with the travelling distance calculation portion 11, the diagnosis portion 12, and a car navigation system 50.

The control portion 13 controls the diagnosis portion 12 to execute the malfunction diagnosis of the diagnosis object, based on an information correlative to the travelling distance D of the hybrid vehicle inputted from the travelling distance calculation portion 11. When the travelling distance D is a value satisfying a predetermined condition, the diagnosis portion 12 sends a request of forcibly activate the actuator to the control portion 13 even when the internal combustion engine 20 is not running. The control portion 13 controls to drive the actuator or the sensor which are correlative to the diagnosis object of the internal combustion engine 20, according to the request. The diagnosis portion 12 executes the malfunction diagnosis according to a diagnosis procedure that is predetermined.

The predetermined condition is satisfied that the travelling distance D calculated by the travelling distance calculation portion 11 becomes shorter than or equal to a threshold distance that is predetermined. According to the present embodiment, the threshold distance is a distance of a travelling passage estimated by the car navigation system 50 based on a present position of the hybrid vehicle and a destination position that is set. The distance of the travelling passage which is estimated is referred to as an estimation distance L.

Figure 2:
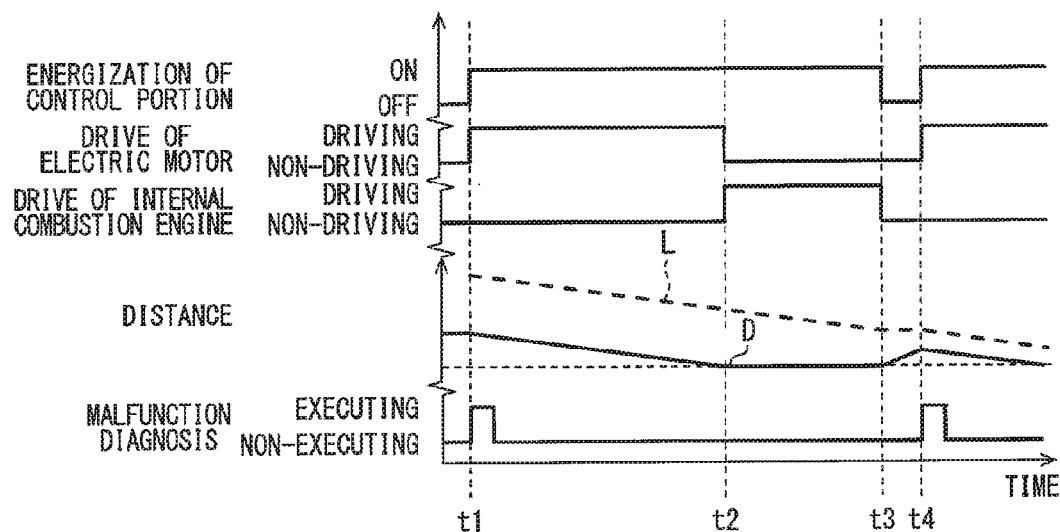
FIG. 2 is a time chart showing operations of the electronic controller and the peripheral devices.
Figure 3:
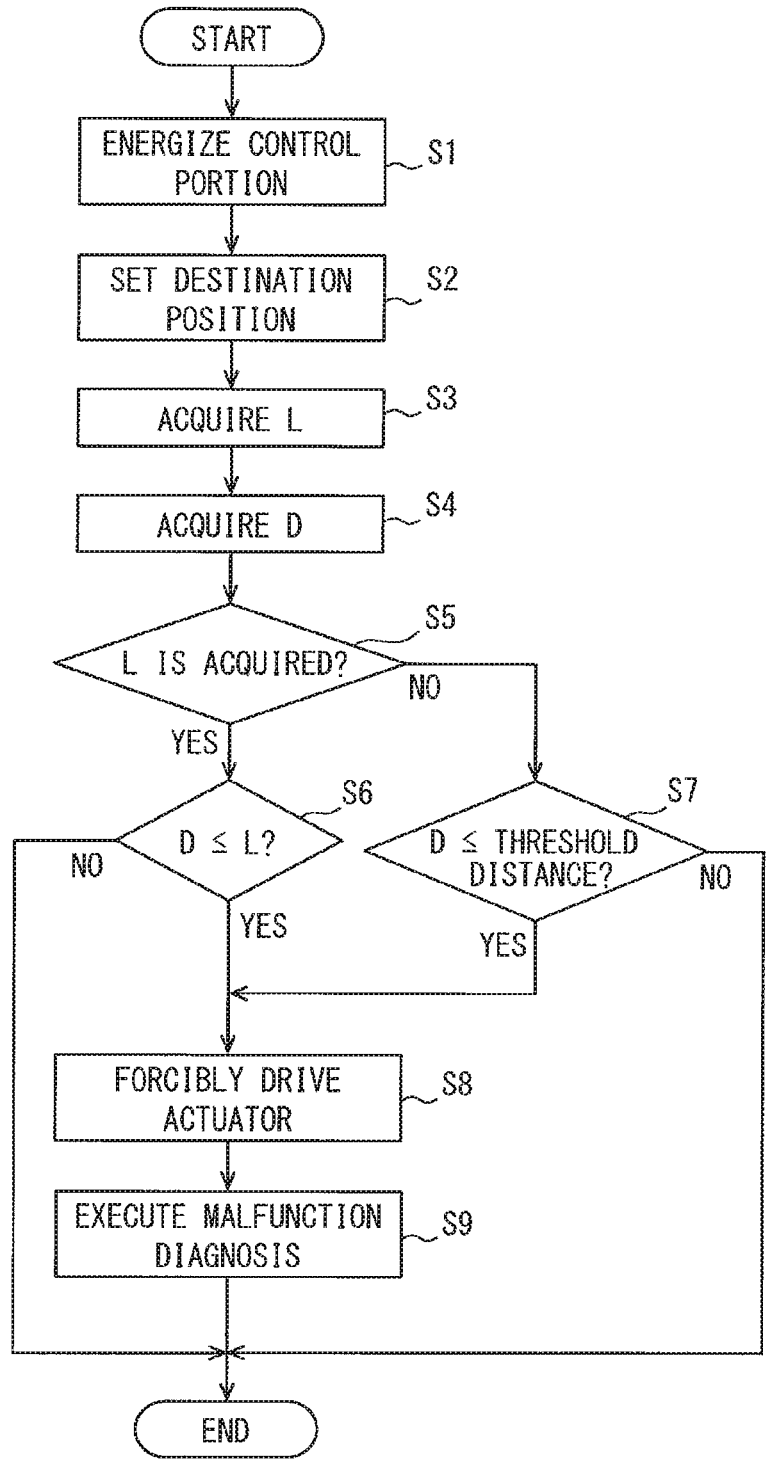
FIG. 3 is a flowchart showing a control flow of the electronic controller.

Referring to FIGS. 2 and 3, an operation of the electronic controller 10 will be described.

FIG. 2 is a time chart showing a relationship between an energization of the control portion 13, a drive of the internal combustion engine 20, a drive of the electric motor 30, the estimation distance L that is a distance from the present position to the destination position, the travelling distance D where the hybrid vehicle can travel by using the electric motor 30 as the driving source, the malfunction diagnosis, and time. FIG. 3 is a flowchart showing a control flow executed by the electronic controller 10.

As shown in FIG. 2, a user of the hybrid vehicle turns on a power switch of the hybrid vehicle at a time point t1 before the hybrid vehicle travels. As shown in FIG. 3, at S1, when the control portion 13 is energized, the car navigation system 50 is turned on. As shown in FIG. 2, a start switch driving the electric motor 30 is turned on at the time point, and the electric motor 30 is changed to be driven. In this case, the internal combustion engine 20 is not driven. Operations in S2 to S7 are executed at the time point t1.

At S2, the user inputs the destination position to the car navigation system 50. The car navigation system 50 searches a route that is the travelling passage based on a via point or a priority matter that is optionally specified by the user, from a database including a map data and a traffic situation. The user selects one route from searched routes, so as to set the destination position and the route to be used.

At S3, the control portion 13 acquires the distance from the present position to the destination position that is the estimation distance L, from the car navigation system 50. Since the destination position and the route are determined at S2, the control portion 13 can acquire the estimation distance L of the route from the car navigation system 50.

At S4, the travelling distance calculation portion 11 calculates the travelling distance D based on the power surplus quantity of the battery 40, and the control portion 13 acquires an information of the travelling distance D from the travelling distance calculation portion 11. Specifically, the travelling distance calculation portion 11 calculates the travelling distance D, based on the power surplus quantity of the battery 40 and a consumption power of when the electric motor 30 is driven by a power of the battery 40.

At S5, the control portion 13 determines whether the estimation distance L is acquired. When the user determines the route to the destination position by using the car navigation system 50 at S2, the control portion 13 determines that the estimation distance L is acquired (S5: Yes) and proceeds to S6.

When the estimation distance L cannot be acquired in a case where the user does not set the destination position or the car navigation system 50 is not mounted to the hybrid vehicle, the control portion 13 determines that the estimation distance L is not acquired (S5: No). Then, the control portion 13 proceeds to S7.

As shown in FIG. 2, since the estimation distance L to the destination position is determined, the control portion 13 determines that the estimation distance L is acquired at S5 (S5: Yes).

At S6, the control portion 13 compares the travelling distance D with the estimation distance L, and determines whether the travelling distance D is shorter than or equal to the estimation distance L. When the control portion 13 determines that the travelling distance D is shorter than or equal to the estimation distance L (S6: Yes), the control portion 13 proceeds to S8. When the control portion 13 determines that the travelling distance D is longer than the estimation distance L, the control portion 13 terminates the present control flow. As shown in FIG. 2, since the estimation distance L is longer than the travelling distance D, the control portion 13 determines that the travelling distance D is shorter than or equal to the estimation distance L at S6 (S6: Yes).

At S7, the control portion 13 compares the travelling distance D with the threshold distance, and determines whether the travelling distance D is shorter than or equal to the threshold distance. When the control portion 13 determines that the travelling distance D is shorter than or equal to the threshold distance (S7: Yes), the control portion 13 proceeds to S8. When the control portion 13 determines that the travelling distance D is longer than the threshold distance (S7: No), the control portion 13 terminates the present control flow. The threshold distance may be set to any values. For example, the threshold distance is set to a value equal to a distance where the hybrid vehicle can travel when the battery 40 is fully charged. When the threshold distance is equal to the estimation distance L, S7 is as the same as S6.

As the above description, the control portion 13 determines a determination of Yes in S6 or S7, the control portion 13 proceeds to S8. At S8, the control portion 13 controls to forcibly drive the actuator that is the diagnosis object in the internal combustion engine 20 or to drive the actuator activating the sensor that is the diagnosis object in the internal combustion engine 20 and detects a physical quantity. A drive of the actuator is executed in a condition that the hybrid vehicle travels by utilizing the internal combustion engine 20 in a normal state, or is executed based on a request specification predetermined for the malfunction diagnosis.

At S9, the control portion 13 sends the instruction to the diagnosis portion 12 to execute the malfunction diagnosis of the actuator and the sensor which are the diagnosis objects. The diagnosis portion 12 executes the malfunction diagnosis of the diagnosis objects based on the request specification. In other words, as shown in FIG. 2, the malfunction diagnosis starts at the time point t1.

As shown in FIG. 2, in a time period from the time point t1 to a time point t2, the hybrid vehicle travels in an EV travelling mode where the electric motor 30 is used as the driving source after S9. Since the power surplus quantity of the battery 40 is insufficient, the internal combustion engine 20 is switched to be the driving source instead of the electric motor 30 at the time point t2. Since the malfunction diagnosis of the diagnosis object in the internal combustion engine 20 has been executed at the time point t1, the malfunction diagnosis is not executed at the time point t2 that the driving source is switched.

In a time period from the time point t2 to a time point t3, the hybrid vehicle travels by using the internal combustion engine 20 as the driving source. It is assumed that the user stops the hybrid vehicle at the time point t3 before the hybrid vehicle reaches the destination position. In this case, the user turns off the power switch, and thereby deenergizing the control portion 13. A setting of the destination position is maintained in the car navigation system 50. The user charges the battery 40. Then, at a time point t4, the user turns on the power switch of the hybrid vehicle again.

A shown in FIG. 2, the control portion 13 is energized again at the time point t4, and S1 shown in FIG. 3 is executed. Since the setting of the destination position has already been executed, the control portion 13 proceeds to S3. At S3, the control portion 13 acquires the estimation distance L to the destination position again. At S4, the control portion 13 acquires the travelling distance D again. At S5, the control portion determines the determination of Yes as the same as that at the time point t1. At S6, since the control portion 13 determines that the travelling distance D is shorter than or equal to the estimation distance L as shown in FIG. 2, the control portion 13 executes the malfunction diagnosis of the diagnosis object in the internal combustion engine 20 at S9 after S8.

Effects of the electronic controller 10 according to the present embodiment will be described.

The diagnosis object is forcibly driven and the malfunction diagnosis is executed in a case where the travelling distance D is shorter than or equal to the threshold distance that is predetermined. Particularly, the diagnosis object is forcibly driven and the malfunction diagnosis is executed in a case where the travelling distance D is shorter than or equal to the estimated distance L obtained based on the present position and the destination position. In other words, when it is assumed that the driving source of the hybrid vehicle is changed from the electric motor 30 to the internal combustion engine 20 in a travelling of the hybrid vehicle, the diagnosis object included in the internal combustion engine 20 can be diagnosed before the hybrid vehicle starts to be driven by the internal combustion engine 20. Thus, when a malfunction affecting the travelling where the internal combustion engine 20 is used is generated, it can be avoided that a drivability is deteriorated due to a timing that the internal combustion engine 20 is switched to be used as the driving source in the travelling. Conventionally, when the internal combustion engine starts to be used in a case where the internal combustion engine 20 is not used for a long time period, the malfunction diagnosis is executed and it is possible that a malfunction of the internal combustion engine 20 is detected. According to the present embodiment, since the malfunction diagnosis is forcibly executed before the internal combustion engine 20 is used, the malfunction of the internal combustion engine 20 can be detected, and the hybrid vehicle can travel to a vehicle dealer in the EV travelling mode.

First Modification Example

According to a first modification example, a first determination condition forcibly driving the diagnosis object and executing the malfunction diagnosis can be added with respect to the predetermined condition in the embodiment.

Figure 4:
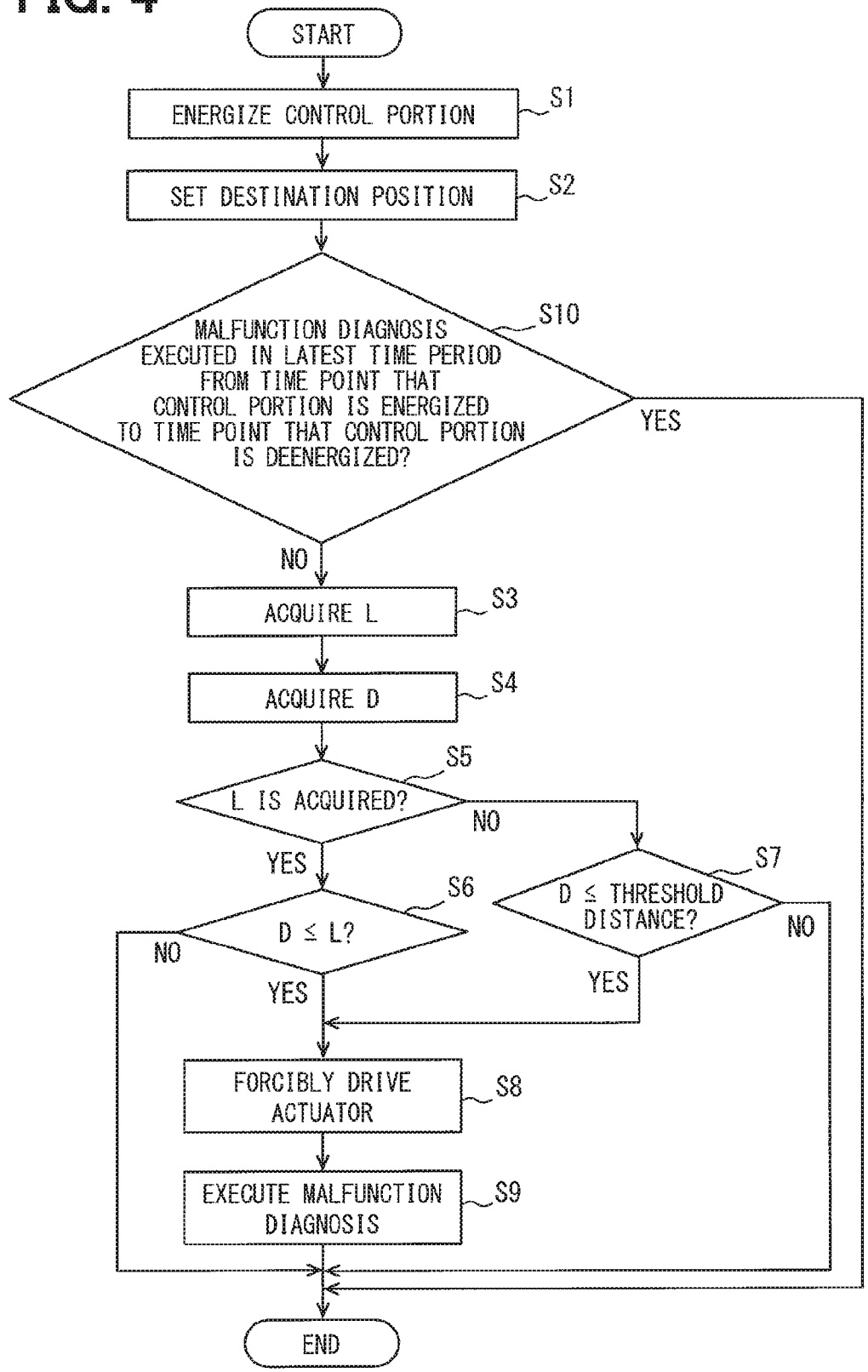
FIG. 4 is a flowchart showing the control flow of the electronic controller, according to a first modification example, a second modification example, and a third modification example.

As shown in FIG. 4, the control portion 13 may execute an operation in S10 after S2. At S10, the control portion 13 determines whether the malfunction diagnosis has been executed in a latest time period from a time point that the control portion 13 is energized to a time point that the control portion 13 is deenergized. In other words; the control portion 13 determines whether the first determination condition is satisfied. When the control portion 13 determines that the malfunction diagnosis has been executed in the latest time period (S10: Yes), the electronic controller 10 terminates the present control flow. When the control portion 13 determines that the malfunction diagnosis has not been executed in the latest time period (S10: No), the control portion 13 proceeds to S3 and executes the control flow as the same as the embodiment.

According to the embodiment, as shown in FIG. 2, the malfunction diagnosis is executed at the time point t4. About the time point t4, the time point that the control portion 13 is energized in the latest time period is the time point t1, and the time point that the control portion 13 is deenergized in the latest time period is the time point t3. In this case, since the malfunction diagnosis has been executed at the time point t1, the control portion 13 determines that the malfunction diagnosis has been executed in the latest time period (S10: Yes) at the time point t4 according to the first modification example. Thus, the malfunction diagnosis is not executed at the time point t4.

According to the first modification example, the electronic controller 10 suppresses an executing frequency of the malfunction diagnosis with respect to that according to the embodiment. It is preferable that the malfunction diagnosis is executed at a high executing frequency in view of detecting the malfunction in an early stage. However, when the malfunction diagnosis is executed at the high executing frequency that is remarkably high, the actuator or a fuel consumption of the internal combustion engine 20 is deteriorated. Thus, the electronic controller 10 suppresses the executing frequency according to the first modification example, so as to prevent that the actuator or the fuel consumption of the internal combustion engine 20 is deteriorated.

Second Modification Example

According to a second modification example, the first determination condition in S10 shown in FIG. 4 can be replaced by a second determination condition in which the control portion 13 determines whether the malfunction diagnosis has been executed after the destination position is set. In this case, when the control portion 13 determines that the malfunction diagnosis has been executed for at least once in a time period from a time point that the destination position is set to a present time point before the hybrid vehicle reaches the destination position, the electronic controller 10 can terminate the present control flow. In other words, since the malfunction diagnosis is executed for only once in a case where the destination position is maintained, the executing frequency of the malfunction diagnosis can be suppressed, and a deterioration of the actuator or a deterioration of the fuel consumption can be suppressed.

Third Modification Example

According to a third modification example, the first determination condition in S10 shown in FIG. 4 can be replaced by a third determination condition in which the control portion 13 determines whether a non-executing time period calculated from a time point that a latest malfunction diagnosis is executed is shorter than a threshold time period that is predetermined. When the control portion 13 determines that the non-executing time period is shorter than the threshold time period, the electronic controller 10 can terminate the present control flow. According to the third modification example, when the threshold time period has elapsed from the time point that the latest malfunction diagnosis of the internal combustion engine 20 is executed, the diagnosis object is forcibly driven and the malfunction diagnosis is executed. According to the third modification example, the executing frequency of the malfunction diagnosis can be suppressed, and the deterioration of the actuator or the deterioration of the fuel consumption can be suppressed.

The non-executing time period is a time period from the time point that the latest malfunction diagnosis is executed to a time point that a following malfunction diagnosis is executed, and the non-executing time period is calculated only in a time period from the time point that the control portion 13 is energized to the time point that the control portion 13 is deenergized. Thus, when the control portion 13 is deenergized and the hybrid vehicle is completely stopped, the non-executing time period is not calculated. That is, only when the malfunction diagnosis is not executed in a case where the hybrid vehicle is activated, the non-executing time period is calculated.

Alternatively, the non-executing time period is a time period from the time point that the latest malfunction diagnosis is executed to the time point that the following malfunction diagnosis is executed, and the non-executing time period is calculated based on a time difference between the time point that the latest malfunction diagnosis is executed and the present time point. In this case, the control portion 13 stores the time point that the latest malfunction diagnosis is executed in a memory that is not shown. Then, the control portion 13 defines the time difference between the time point that the latest malfunction diagnosis is executed and the present time point as the non-executing time period of the malfunction diagnosis. The control portion 13 may obtain the time difference by utilizing a device indicating time. A clock in the car navigation system 50 or the hybrid vehicle can be used to obtain the time difference.

According to the above modification examples, the determination conditions are individually added after S2. However, a combination of at least two of the determination conditions may be added after S2.

Fourth Modification Example

Figure 5:
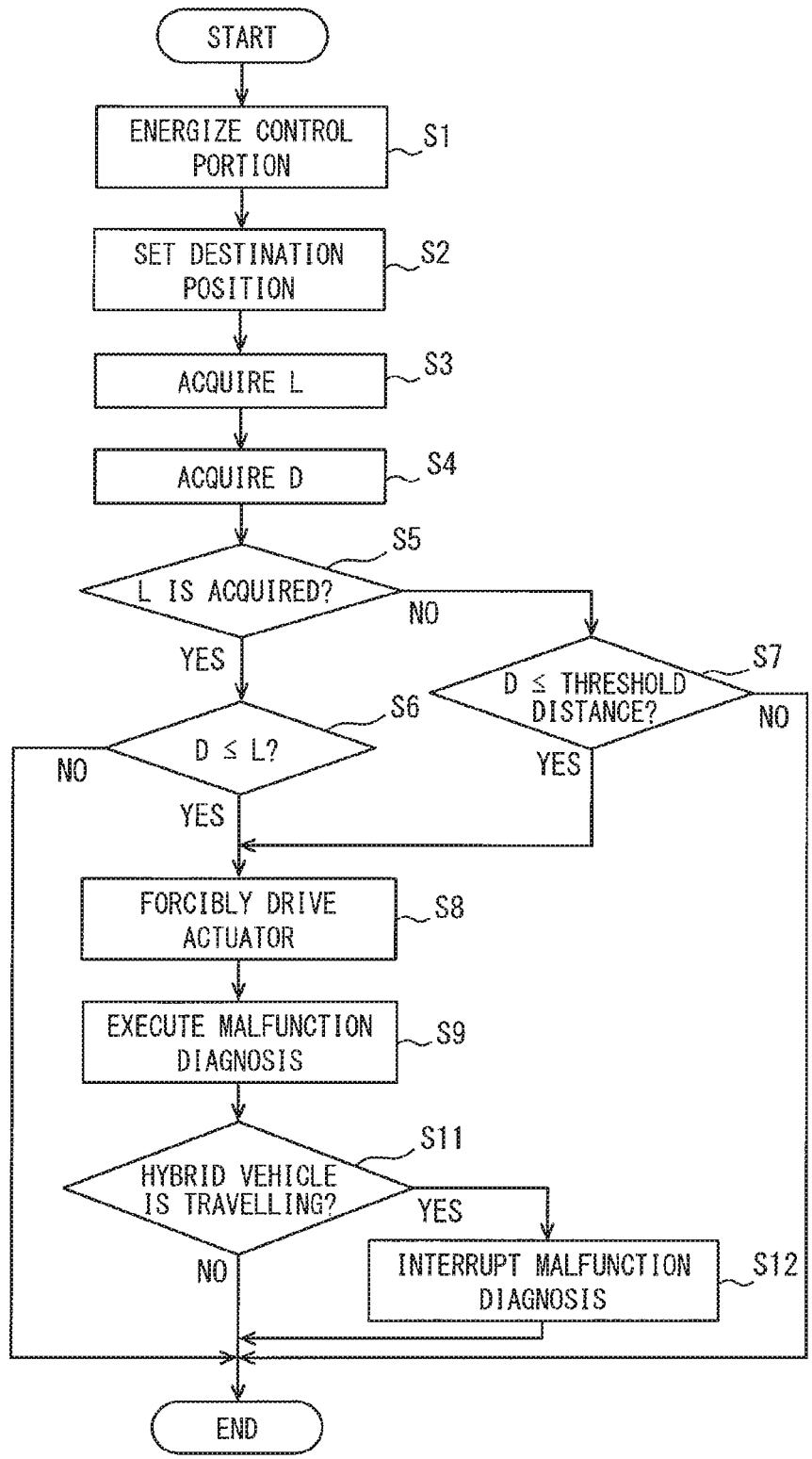
FIG. 5 is a flowchart showing the control flow of the electronic controller, according to a fourth modification example.

The malfunction diagnosis that is being executed can be interrupted based on a state of the hybrid vehicle. As shown in FIG. 5, the control portion 13 executes an operation in S11, after the control portion 13 proceeds to S9 according to the control flow shown in FIG. 1.

At S11, the control portion 13 determines whether the hybrid vehicle is travelling based on a vehicle speed. In other words, the control portion 13 determines whether a fourth determination condition is satisfied. The vehicle speed is a travelling speed of the hybrid vehicle. When the control portion 13 determines that the hybrid vehicle is travelling (S11: Yes), the control portion proceeds to S12. At S12, the control portion 13 interrupts the drive of the diagnosis object, and sends a request to the diagnosis portion 12 to interrupt the malfunction diagnosis.

When the actuator that is generally not driven is forcibly driven in the travelling of the hybrid vehicle, the user may sense a deterioration of the drivability. Since operations in S11 and S12 are executed, the drive of the actuator and the malfunction diagnosis can be interrupted at the time point that the hybrid vehicle starts to travel, and an uncomfortability of the user generated due to the deterioration of the drivability can be eased.

When the control portion 13 determines that the hybrid vehicle is not travelling (S11: No), the control portion 13 continuously executes the malfunction diagnosis as the same as that according to the embodiment.

The fourth determination condition in S11 shown in FIG. 5 can be replaced by a fifth determination condition in which the control portion 13 determines whether the vehicle speed is greater than a predetermined speed. In this case, when the control portion 13 determines that the vehicle speed is greater than the predetermined speed, the control portion 13 interrupts the malfunction diagnosis. Since the drive of the actuator and the malfunction diagnosis can be interrupted at a time point that the vehicle speed exceeds the predetermined speed, the uncomfortability of the user generated due to the deterioration of the drivability can be eased.

Alternatively, the fourth determination condition in S11 shown in FIG. 5 can be replaced by a sixth determination condition in which the control portion 13 determines whether an elapsed time period from the time point that the control portion 13 is energized exceeds a predetermined time period. In this case, the malfunction diagnosis is executed in the predetermined time period after the time point that the control portion 13 is energized. When the control portion 13 determines that the elapsed time period exceeds the predetermined time period, the control portion 13 interrupts the malfunction diagnosis. It is remarkably possible that the hybrid vehicle is travelling when a time period has elapsed from the time point that the control portion 13 is energized. Thus, the malfunction diagnosis of the internal combustion engine 20 is interrupted before the hybrid vehicle starts to travel, and the deterioration of the drivability can be suppressed.

Other Embodiment

The present disclosure is not limited to the embodiments mentioned above, and can be applied to various embodiments within the spirit and scope of the present disclosure.

The determination conditions in the fourth modification example may be added to the determination conditions in the first modification example, the second modification example, and the third modification example.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An electronic controller controlling a drive of a vehicle that uses an internal combustion engine and an electric motor as a driving source, comprising:
   a travelling distance calculation portion that is configured to calculate a travelling distance which is how far the vehicle can travel by using the electric motor as the driving source, based on a power surplus quantity of a battery that supplies electric power to the electric motor;
   a diagnosis portion that is configured to diagnose a diagnosis object included in the internal combustion engine; and
   a control portion that is configured to control the internal combustion engine, wherein
   when the travelling distance that is calculated which is how far the vehicle can travel by using the electric motor as the driving source based on the power surplus quantity of the battery is shorter than or equal to a threshold distance that is predetermined, the control portion (i) forcibly drives the diagnosis object included in the internal combustion engine, regardless of whether the internal combustion engine is running, and (ii) controls the diagnosis portion to execute a malfunction diagnosis of the diagnosis object included in the internal combustion engine,
   wherein the electronic controller is configured to be connected to the internal combustion engine and the electric motor in the vehicle,
   wherein the traveling distance calculation portion is configured to be connected with the battery that supplies electric power to the electric motor.

2. The electronic controller according to claim 1, wherein the threshold distance is an estimation distance of a travelling passage that is estimated based on a present position of the vehicle and a destination position that is set.

3. The electronic controller according to claim 2, wherein when the control portion is energized, the control portion is configured to compare the travelling distance with the estimation distance to the destination position, and when a condition that the travelling distance is shorter than or equal to the estimation distance used as the threshold distance is satisfied, the control portion is configured to forcibly drive the diagnosis object and controls the diagnosis portion to execute the malfunction diagnosis of the diagnosis object.

4. The electronic controller according to claim 2, wherein when a condition that the malfunction diagnosis of the diagnosis object has not been executed in a latest time period from a time point that the control portion is energized to a time point that the control portion is deenergized is satisfied, the control portion is configured to forcibly drive the diagnosis object and controls the diagnosis portion to execute the malfunction diagnosis of the diagnosis object.

5. The electronic controller according to claim 2, wherein when a condition that the malfunction diagnosis of the diagnosis object has not been executed in a time period from a time point that the destination position is set to a present time point is satisfied, the control portion is configured to forcibly drive the diagnosis object and controls the diagnosis portion to execute the malfunction diagnosis of the diagnosis object.

6. The electronic controller according to claim 2, wherein when a condition that a non-executing time period calculated from a time point that a latest malfunction diagnosis is executed is longer than or equal to a threshold time period that is predetermined is satisfied, the control portion is configured to forcibly drive the diagnosis object and control the diagnosis portion to execute the malfunction diagnosis of the diagnosis object.

7. The electronic controller according to claim 6, wherein the non-executing time period is a time period from the time point that the latest malfunction diagnosis is executed to a time point that a following malfunction diagnosis is executed, and
the non-executing time period is calculated only in a time period from the time point that the control portion is energized to the time point that the control portion is deenergized.

8. The electronic controller according to claim 6, wherein the non-executing time period is a time period from the time point that the latest malfunction diagnosis is executed to a time point that a following malfunction diagnosis is executed, and
the non-executing time period is calculated based on a time difference between the time point that the latest malfunction diagnosis is executed and the present time point.

9. The electronic controller according to claim 1, wherein the control portion is configured to forcibly drive the diagnosis object and control the diagnosis portion to execute the malfunction diagnosis of the diagnosis object, in a time period from a time point that the control portion is energized to a time point that the vehicle starts to travel.

10. The electronic controller according to claim 1, wherein
  when a condition that a vehicle speed is less than or equal to a predetermined speed, the control portion is configured to forcibly drive the diagnosis object and controls the diagnosis portion to execute the malfunction diagnosis of the diagnosis object.

11. The electronic controller according to claim 1, wherein
  the control portion is configured to forcibly drive the diagnosis object and control the diagnosis portion to execute the malfunction diagnosis of the diagnosis object, in a predetermined time period after a time point that the control portion is energized.

12. The electronic controller according to claim 1, wherein
  the control portion is configured to forcibly drive the diagnosis object included in the internal combustion engine by, regardless of whether the internal combustion engine is running, (i) activating an actuator or a sensor that is the diagnosis object which is included in the internal combustion engine and (ii) detecting a physical quantity that represents the malfunction.

13. The electronic controller according to claim 1, wherein
  the control portion is configured to perform the forcible drive of the diagnosis object, which is a component in the internal combustion engine, and controls the diagnosis portion, while the electric motor is the driving source.

* * * * *